United States Patent [19]
Horski

[11] Patent Number: 5,844,338
[45] Date of Patent: Dec. 1, 1998

[54] SLIM-LINE BRUSHLESS MOTOR WITH INSIDE MOUNTED SINGLE BEARING

[75] Inventor: Marek Horski, London, Canada

[73] Assignee: Siemens Electric Limited, Canada

[21] Appl. No.: 980,183

[22] Filed: Nov. 26, 1997

Related U.S. Application Data

[63] Continuation of Ser. No. 574,007, Dec. 18, 1995, abandoned.

[51] Int. Cl.⁶ .............................. H02K 5/04; H02K 5/16; H02K 17/00
[52] U.S. Cl. ........................ 310/90; 310/67 R; 310/91; 310/254; 310/268
[58] Field of Search ...................... 310/67 R, 90, 310/91, 268, 254

[56] References Cited

U.S. PATENT DOCUMENTS

| | | | |
|---|---|---|---|
| 2,658,157 | 11/1953 | Brouwer | 310/156 |
| 2,832,906 | 4/1958 | Koons | 310/90 |
| 3,453,465 | 7/1969 | De Boer et al. | 310/49 |
| 3,512,025 | 5/1970 | Quellet | 310/154 |
| 3,757,883 | 9/1973 | Asberg | 180/70 R |
| 3,767,949 | 10/1973 | Newill | 310/90 |
| 3,988,024 | 10/1976 | Watanabe et al. | 310/237 |
| 3,993,920 | 11/1976 | Sato | 310/66 |
| 3,997,805 | 12/1976 | Dochterman | 310/90 |
| 4,007,390 | 2/1977 | Muller et al. | 310/90 |
| 4,049,363 | 9/1977 | Baumann et al. | 416/157 B |
| 4,109,170 | 8/1978 | Fujita et al. | 310/68 R |
| 4,209,721 | 6/1980 | Feldle et al. | 310/67 R |
| 4,220,879 | 9/1980 | Hoshimi et al. | 310/68 R |
| 4,242,608 | 12/1980 | Ishigaki et al. | 310/68 R |
| 4,319,152 | 3/1982 | van Gils | 310/201 |
| 4,322,666 | 3/1982 | Muller | 310/254 |
| 4,352,036 | 9/1982 | Kuwako | 310/83 |
| 4,428,719 | 1/1984 | Hayashibara et al. | 417/354 |
| 4,539,497 | 9/1985 | Boyer | 310/75 R |
| 4,686,400 | 8/1987 | Fujisaki et al. | 310/67 R |
| 4,701,651 | 10/1987 | Tanaka | 310/90 |
| 4,733,115 | 3/1988 | Barone et al. | 310/68 R |
| 4,763,037 | 8/1988 | Hashimoto et al. | 310/268 |
| 4,788,464 | 11/1988 | Nishikawa et al. | 310/268 |
| 4,793,562 | 12/1988 | Hirmke et al. | 241/101.2 |
| 4,814,653 | 3/1989 | Hasegawa et al. | 310/90 |
| 4,839,551 | 6/1989 | Tomisawa | 310/90 |
| 4,851,731 | 7/1989 | Saotome et al. | 310/258 |
| 4,853,567 | 8/1989 | Muramatsu et al. | 310/67 R |
| 4,926,992 | 5/1990 | Linnig | 192/48.2 |
| 4,978,878 | 12/1990 | Dijken | 310/268 |
| 4,980,590 | 12/1990 | Taniguchi et al. | 310/81 |
| 4,987,333 | 1/1991 | Noguchi et al. | 310/268 |
| 5,027,025 | 6/1991 | Saneshige et al. | 310/156 |
| 5,036,235 | 7/1991 | Kleckner | 310/90.5 |
| 5,097,170 | 3/1992 | Baines | 310/268 |
| 5,124,604 | 6/1992 | Swartz | 310/688 |
| 5,144,183 | 9/1992 | Farrenkopf | 310/268 |
| 5,146,144 | 9/1992 | Lee | 318/138 |
| 5,163,528 | 11/1992 | Kawamoto et al. | 180/65.5 |
| 5,252,871 | 10/1993 | Inoue | 310/90 |
| 5,349,259 | 9/1994 | Kaneko et al. | 310/261 |
| 5,396,135 | 3/1995 | Iwazaki et al. | 310/90 |
| 5,461,271 | 10/1995 | Asama et al. | 310/91 |

*Primary Examiner*—Thomas M. Dougherty
*Assistant Examiner*—Tran N. Nguyen

[57] ABSTRACT

A slim-line direct current (DC) brushless motor for automotive and HVAC applications utilizes a single contact bearing assembly to rotatably couple an exterior rotor to an interior stator. The rotor includes a flat permanent magnetic and the stator assembly includes a flat coil. The flat coil is made from a stamped copper member. The rotor is staked to the bearing assembly by a hub-shaft. The lone contact bearing can be a double horizontal row contact bearing, a four point contact bearing, or a closed cylindrical roller bearing. A cooling fan is disposed on the top of the rotor to cool internal control circuitry within the motor. The motor is easily assembled and has a minimal number of moving parts.

20 Claims, 4 Drawing Sheets

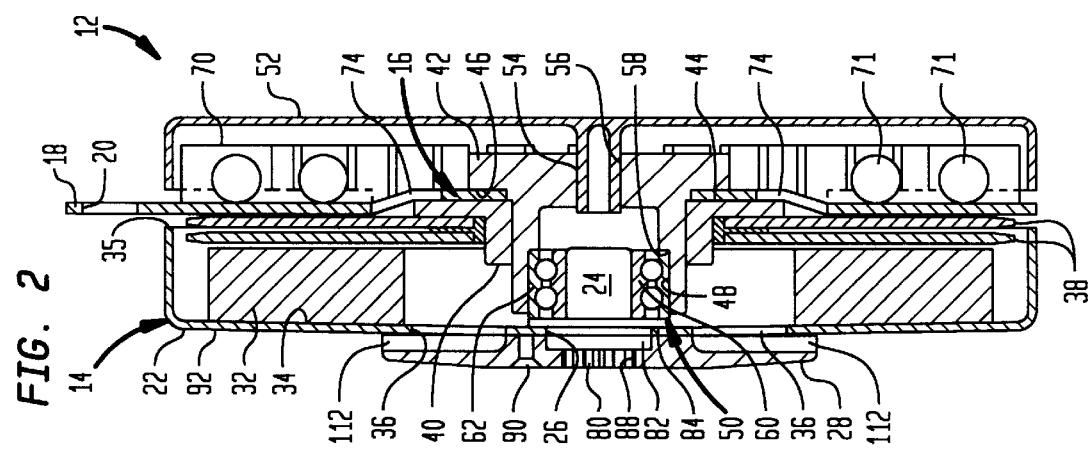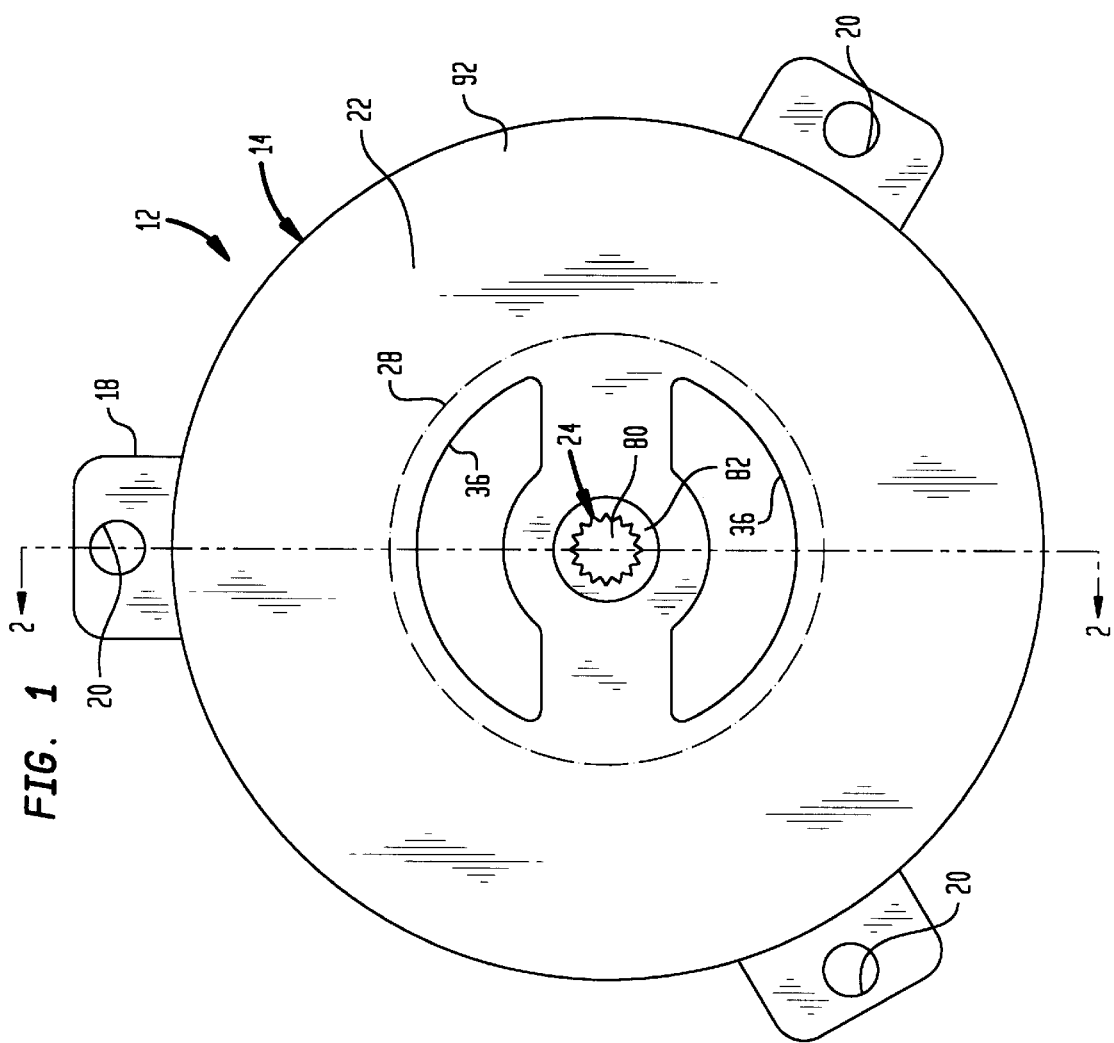

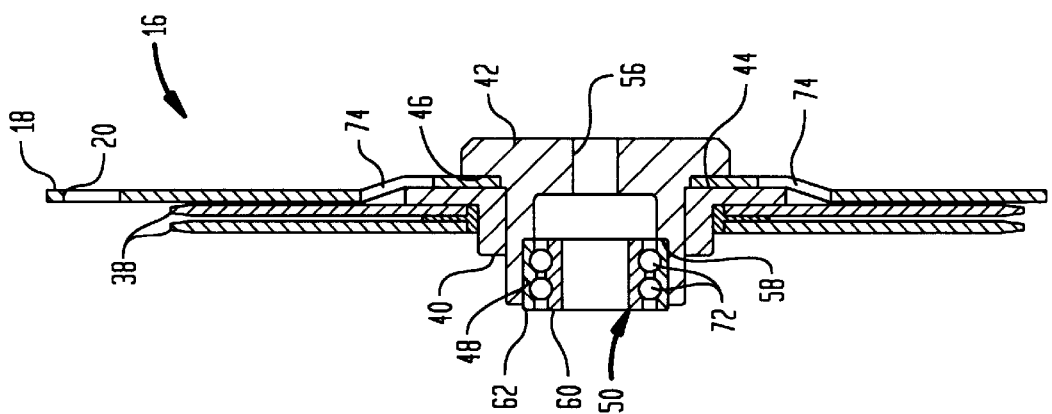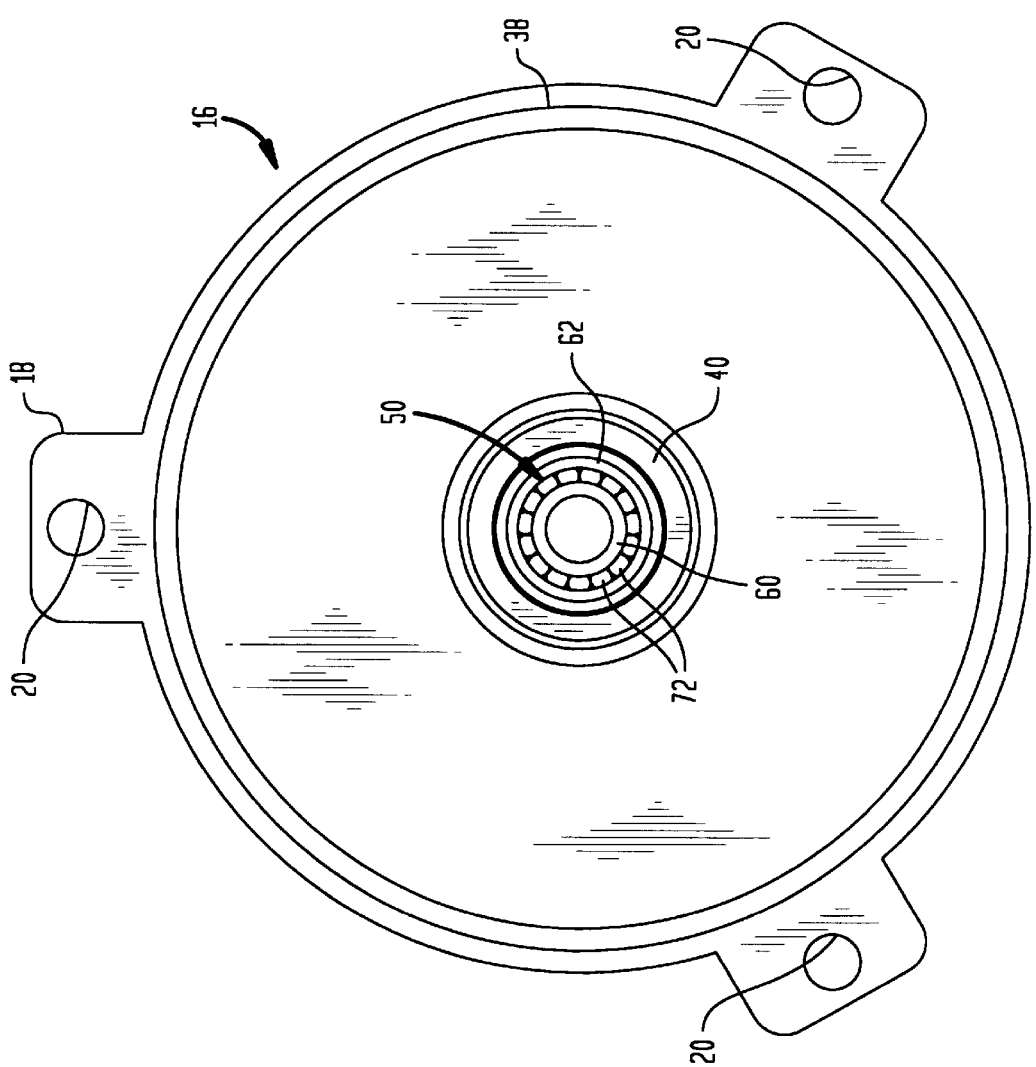

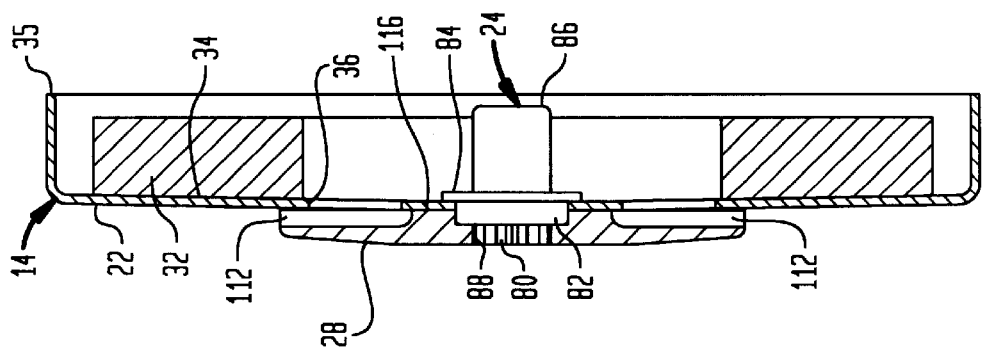
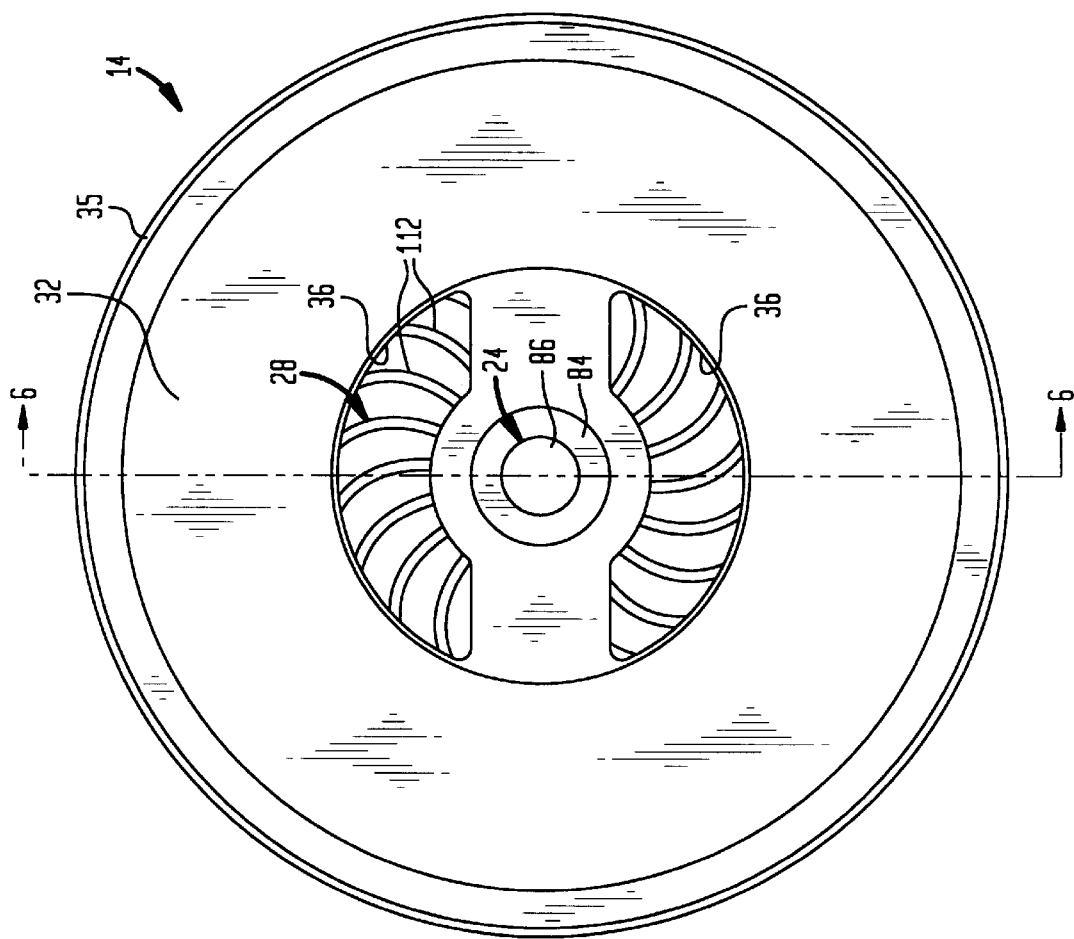

SLIM-LINE BRUSHLESS MOTOR WITH INSIDE MOUNTED SINGLE BEARING

CROSS-REFERENCE TO RELATED APPLICATION

This is a continuation of Ser. No. 08/574,007 filed on Dec. 18, 1995 now abandoned.

FIELD OF THE INVENTION

The present invention relates to a brushless motor for various applications including automotive and HVAC applications. More particularly, the present invention relates to a slim-line brushless motor.

BACKGROUND OF THE INVENTION

Direct current (DC) brushless motors have been used in a variety of electronic and industrial applications such as automotive applications where the motor drives a fan to cool an automobile engine, moves a windshield wiper, or raises and lowers a window or doorlock, or drives a fan to move ventilation air. Conventional DC brushless motors typically include a stator comprising a core having windings, a rotor having permanent magnets, and a shaft supporting the motor with respect to the stator. At least two bearing assemblies are generally employed to rotatably couple the shaft to either the stator or the rotor. The bearing assemblies are necessary to counteract the radial, axial and moment forces associated with the coupling of the rotor to the stator. The use of at least two ball bearing assemblies adds to the cost and assembly time associated with conventional brushless motors. Two ball bearing assemblies require two sets of bearing retainers, two pieces of oil felt, additional lubricant, and a number of other components necessary to maintain the rotatable connection within the motor. Therefore, there is a need for a brushless motor which requires only a single bearing assembly to rotationally support the rotor with respect to the stator. Further, there is a need for a rotatable coupling structure which can be easily assembled with automated manufacturing techniques.

Additionally, conventional DC brushless motors utilize stator coils comprised of wrapped magnetic wires (e.g., free wires). The wrapped magnetic wires engage hooks, stakes, or poles arranged in a variety of configurations. Wrapping magnetic wires requires excess space (e.g., particularly in height) and increases the assembly time associated with the stator.

Applications for DC brushless motors often require that the motor be located in small spaces. For example, in automotive application the electric motor must be placed in narrow spaces within door, hood, and trunk compartments. Such applications require that the motor has a minimal height or profile. Conventional thin DC brushless motors are difficult to assemble due to the moving parts and free wires associated with the stator. The moving parts and free wires also reduce the reliability of the motor. Therefore, there is a need for a slim-line DC brushless motor which is essentially comprised of no moving parts or free wires.

Conventional brushless motors often include electronic circuitry mounted within the motor. The electronic circuitry drives current through the windings of the stator to generate a magnetic field which effects rotation of the rotor. Such electronic circuitry generates heat which must be dissipated from the motor via large, expensive heat sinks. Thus, there is also a need for increased heat dissipation in conventional slim-line brushless motors.

SUMMARY OF THE INVENTION

The present invention relates to a slim-line brushless motor. The slim-line brushless motor includes a rotor assembly having a flat magnet, a stator assembly having a flat winding, a single angular contact bearing, and a shaft. The shaft is fit into the angular contact bearing. The rotor assembly is rotatably coupled to the support member via the shaft and the angular contact bearing.

The present invention further relates to brushless motor for automotive applications. The brushless motor includes a rotor, a stator, a shaft and a bearing assembly. The rotor includes at least one flat magnet and at least one aperture. The stator includes at least one flat coil. The bearing assembly is coupled to the stator and rotatably couples the shaft to the stator. The bearing assembly includes a single contact ball bearing. The shaft is coupled to the rotor and the bearing assembly.

The present invention also relates to a brushless motor for automotive applications. The brushless motor includes a rotor, a stator, a single angular contact bearing means, and a shaft. The rotor includes a first flat magnetic means for providing a first magnetic field, and the stator includes a second flat magnetic means for providing a second magnetic field. The single angular contact bearing means rotatably couples the rotor to the stator. The shaft is disposed through the rotor means into the bearing means.

In one exemplary aspect of the present invention, the brushless motor utilizes a flat permanent magnet and a flat coil. The flat permanent magnet is mounted inside the hub of a bell-shaped rotor housing. The flat coil is preferably a circular stamped copper member which has two layers of radial members. The radial members of each layer are fused together to form a magnetic field generating device or coil.

In another exemplary aspect of the present invention, the motor is comprised of essentially stationery parts. The rotor is staked with a hub-shaft which is press fit into a bearing assembly. The bearing assembly is held within a cavity of one of two ring coupling elements. The ring elements are coupled to a flux ring which supports the flat coil of the stator. The mechanical orientation of the rotor, stator, hub-shaft and bearing assembly provides an easy to assemble motor design with a minimal number of moving parts. The hub-shaft preferably has a shaft section which is the same length or shorter than the height of the bearing assembly.

According to a further exemplary aspect of the present invention, the bearing assembly is a lone angular contact ball bearing. The angular contact ball bearing can be a double horizontal row contact ball bearing, a four point contact ball bearing, or a cross cylindrical ball bearing. The angular contact ball bearing effectively counteracts the axial, radial, and moment forces associated with the motor. The use of such a ball bearing provides a low cost, stable rotatable coupling between the rotor and assembly which can be manufactured in a minimal amount of assembly time.

According to yet another exemplary aspect of the present invention, a cooling fan can be directly coupled to the rotor to provide air flow through cooling apertures in the rotor. The air flow advantageously cools control circuitry located within the motor. The fan also covers the cooling apertures of the rotor to protect the interior of the motor.

BRIEF DESCRIPTION OF THE DRAWINGS

The invention will hereinafter described with reference to the accompanying drawings wherein like numerals denote like elements and:

FIG. 1 is a front, end view of a motor in accordance with the first exemplary embodiment of a brushless motor shown with a cooling fan shown in dashed lines;

FIG. 2 is a cross-sectional view of the motor illustrated in FIG. 1 taken along line 2—2;

FIG. 3 is a more detailed end view of the stator assembly illustrated in FIGS. 1 and 2;

FIG. 4 is a cross-sectional view of the stator assembly illustrated in FIG. 3 taken along line 4—4;

FIG. 5 is a rear, end view of the rotor assembly illustrated in FIG. 2, shown with the cooling fan attached;

FIG. 6 is a cross-sectional view of the rotor assembly illustrated in FIG. 5 taken along line 6—6;

Figure 7:
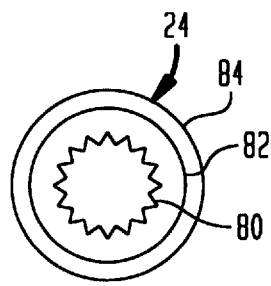
FIG. 7 is a front, end view of the hub-shaft illustrated in FIGS. 1 and 2.

DETAILED DESCRIPTION OF THE PREFERRED EXEMPLARY EMBODIMENT OF THE PRESENT INVENTION

With reference to FIGS. 1 and 2, a direct current (DC) brushless motor 12 includes an outer rotor assembly 14 positioned above and about an inner stator assembly 16 which is fixed to a flux ring 18. Flux ring 18 includes mounting holes 20 which allow motor 12 to be secured to an automotive engine, door compartment, hood compartment, blower unit, container or other apparatus. Rotor assembly 14 includes a bell-shaped rotor housing 22 and is staked by a hub-shaft 24 through a mounting aperture 26 to stator assembly 16. Motor 12 is shown in FIG. 1 with a fan 28 (see FIG. 2) in dashed lines so the orientation of rotor assembly 14 with respect to stator assembly 16 can be observed more easily.

Rotor assembly 14 includes a flat permanent magnet 32 attached to an interior surface 34 of bell-shaped rotor housing 22 (See FIG. 2). Flat magnet 32 is doughnut-shaped (i.e., ring-shaped) and extends from surface 34 to just below an edge 35 of housing 22. Rotor housing 22 includes cooling apertures 36 which expose stator assembly 16 (FIG. 1). Fan 28 (FIG. 2) is attached to hub-shaft 24 and mounted over cooling apertures 36 of rotor housing 22. Apertures 36 allow fan 28 to force air through rotor housing 22 to stator assembly 16. Additionally, fan 28 serves to cover apertures 36 to protect the interior of motor 12.

With reference to FIGS. 1–4, stator assembly 16 includes a pair of flat coils 38, a ring coupling element 40 serves as a locking coupling, and a ring coupling element 42 serves as a bearing coupling. Flat coils 38 are electrically coupled in parallel and mounted proximate magnet 32. Flat coils 38 are stacked in a close, side-by-side relationship with flux ring 18. Flat coils 38 are fixed to flux ring 18 and at least one of flat coils 38 is located intermediate a plane extending through edge 35 of housing 22 and ring 18.

Ring coupling elements 40 and 42 are aluminum and press fit around flux ring 18. Ring coupling element 40 slides over and around ring coupling element 42. Flux ring 18 is held between a bearing surface 44 of element 40 and a bearing surface 46 of element 42. Ring coupling elements 40 and 42 are held to each other by a friction fit and locking tabs (not shown). Alternatively, element 40 can be screwed via threads (not shown), attached with bolts (not shown), or otherwise fixed to element 42.

A bearing assembly 50 is held within a center cavity 48 of ring coupling element 42. Ring coupling element 42 is mechanically fixed to end cup 52 via tabs 54 on cup 52 which are received in a groove 56 of element 42. End cup 52 and flux ring 18 surround stator assembly 16.

Bearing assembly 50 is preferably a single angular contact bearing held within cavity 48 by a friction fit. Alternatively, a ring (not shown) or other bearing seat can be utilized to hold assembly 50 in cavity 48. Element 42 includes a bearing surface 58 which prevents bearing assembly 70 from sliding towards end cup 52. Bearing assembly 50 includes an inner angular ring or race 60 and an outer angular ring or race 62. Race 62 is sized in accordance with cavity 48 to provide a friction fit.

Hub-shaft 24 is preferably press fit into race 60 of bearing assembly 50 to rotationally couple rotor assembly 14 to stator assembly 16. Hub-shaft 24 has a diameter sized with respect to the diameter of inter race 60 so hub-shaft 24 is friction fit with bearing assembly 50. Hub-shaft 24 passes through aperture 26 of rotor assembly 14 and into bearing assembly 50 to rotatably couple rotor assembly 14 to stator assembly 16 with an easy to assemble connection. Alternatively, hub-shaft 24 can be integral with rotor assembly 14 or otherwise mechanically fixed to rotor housing 22 (e.g., welded). The geometry of hub-shaft 24 is discussed in more detail below with reference to FIGS. 7 and 8.

Flux ring 18 is soldered or otherwise attached to a multi-chip module (MCM) control circuit 70 (FIG. 2) located within motor 12. Control circuit 70 typically includes electronic devices, wiring, connectors and heat dissipating devices such as heat sinks 71. Alternatively, control circuit 70 can be a printed circuit board (PCB) or other electronic module. Control circuit 70 is disposed in-line with cooling apertures 36 so air flow driven by sucking fan 28 can pass control circuit 70. Control circuit 70 drives electric signals to or electrically commutates flat coils 38 via a connection (not shown) across flux ring 18. (Circuit 70 is coupled to DC power (e.g., car battery) via appropriate terminals and conductors (not shown).)

With reference to FIGS. 3 and 4, bearing assembly 50 is preferably sized with a minimal height (e.g., approximately the same size as cavity 48 in ring coupling element 42) and yet have enough rigidity to mitigate axial, radial and moment forces associated with the rotation of motor 12. Hub-shaft 24 is also sized for minimal height and is almost completely disposed with bearing assembly 50. Such a configuration for rotatably coupling rotor assembly 14 to stator assembly 16 provides an advantageous thin structure using a minimal amount of moving parts for motor 12 which can be easily manufactured.

Bearing assembly 50 preferably includes a double horizontal row of ball bearings 72 held between race 60 and race 62. Ball bearing 70 are biased in opposing directions to mitigate axial, radial and moment forces associated with the rotation of motor 12. The use of a lone angular contact bearing assembly 50 eliminates the need for separate and additional bearing assembly (not shown). Such a configuration for rotatably coupling rotor assembly 14 to stator assembly 16 provides an advantageous structure for motor 12 which can easily be manufactured by avoiding problems such as alignment of more than a single bearing assembly.

With reference to FIGS. 3 and 4, stator assembly 16 includes flat coils 38 disposed about ring coupling element 40. Flat coils 38 are coupled to flux ring 18. Flux ring 18 includes apertures 74 (FIG. 4) which expose control circuit 70. Apertures 74 allow air flow from cooling apertures 36 to reach control circuit 70. The air flow advantageously travels from fan 28 through apertures 36 across flat coils 38 and through apertures 74 to circuit 70.

Flat coils 38 are circular stamped copper members as distinguished from conventional planar magnetic wire stators coils. Conventional stator coils rely on stakes, posts, hooks, and other members (not shown) for holding magnetic wires. Flat coils 38 are each comprised of two layers of thin metal bars (not shown) disposed radially about a center point. A first end (the end farthest from the center point) of each metal bar on a first layer is fused with the first end of a corresponding metal bar on a second layer. A second end (the end closest to the center point) of each metal bar on the first layer is fused with the second end of an adjacent metal bar on the second layer. Therefore, the first and second layers of the metal bars of each of flat coils 38 are fused together to form a coil-like structure. Such a configuration provides an easy to manufacture, thin magnetic field producing device which does not require cumbersome magnetic wires. Further, flat coils 38 advantageously do not require bulky holders, stakes, poles or other devices to fix magnetic wires to stator assembly 16.

Flat coils 38 can be fused in a variety of fashions to create coils of different shapes or several coils (not shown) in a variety of orientations or configurations. After flat coils 38 are placed in stator assembly 16 around element 40 (over flux ring 18), flat coils 38 are soldered, fused, or electrically coupled to circuit 70 across flux ring 18. Flat coils 38 are electrically coupled to each other in parallel to produce a stronger magnetic field. Alternatively, coils 38 can be coupled in series for other magnetic field characteristics.

With reference to FIGS. 5 and 6, permanent magnet 32 of rotor assembly 14 is a single doughnut-shaped magnet. Magnet 32 does not cover cooling apertures 36 of rotor housing 22. Rotor assembly 14 is held between a bearing section 84 (FIGS. 7 and 8) of hub-shaft 24 and a bottom side 116 (FIGS. 9 and 10) of fan 28.

Figure 8:
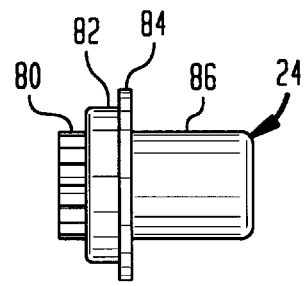
FIG. 8 is a side view of the hub-shaft illustrated in FIG. 7.

With reference to FIGS. 7 and 8, hub-shaft 24 includes a knurled section 80, a hub section 82, bearing section 84, and a shaft section 86. Knurled section 80 is sized for an interference fit with a mounting aperture 88 (FIGS. 9 and 10) of fan 28. Hub section 82 is sized for an interference fit with mounting aperture 26 of rotor assembly 14. Bearing section 84 prevents rotor assembly 14 from sliding in contact with bearing assembly 50. Shaft section 86 is preferably sized in accordance with the height of bearing assembly 50. Shaft section 86 may be slightly longer than bearing assembly 50 and extend nearly to end cap 52. Additionally, shaft section 86 may be shortened if the friction fit connection between assembly 50 and hub-shaft 24 is sufficiently rigid.

Figure 9:
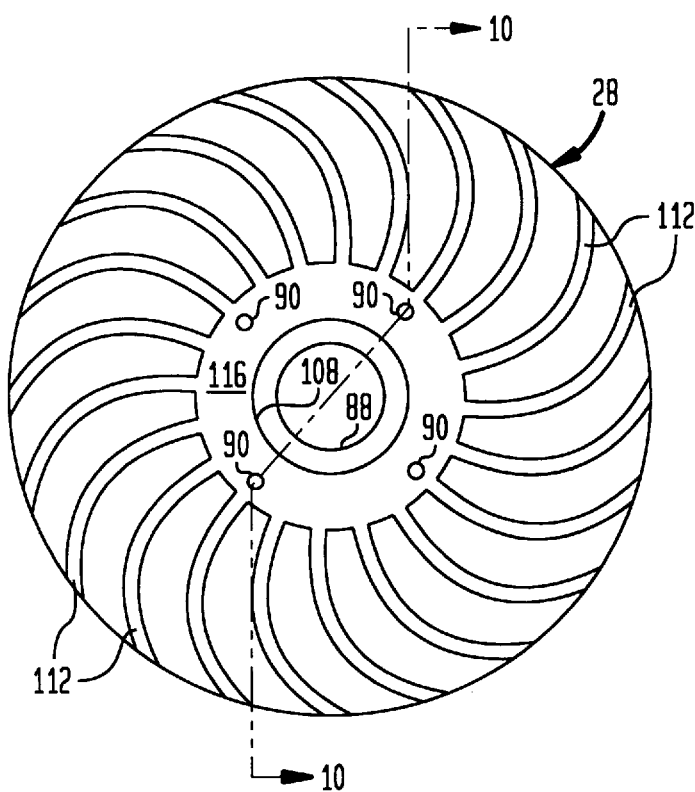
FIG. 9 is a rear, end view of the fan illustrated in FIG. 2.
Figure 10:
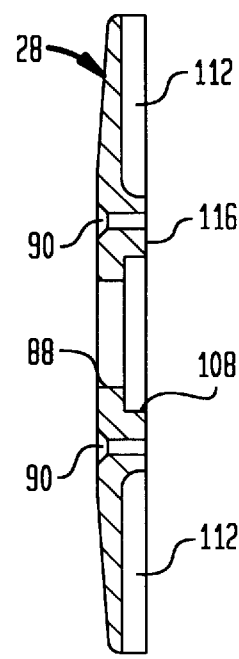
FIG. 10 is a cross-sectional view of the fan illustrated in FIG. 9 taken along line 10—10.

With reference to FIGS. 9 and 10, fan 28 is similar to a vacuum cleaner fan or other device and includes lowered portions or fins 112. Lowered fins 112 are curved and operate to pull air through apertures 36 and 74 from control circuit 70. A mounting aperture 88 of fan 28 is dimensioned for close conformal contact with knurled section 80 of hub-shaft 24. A recess 108 of fan 28 is dimensioned to sit over hub section 82 of hub-shaft 24. Additionally, fan 28 can include mounting holes 90.

A window drive (not shown) for rising and lowering a window in an automobile or a lock mechanism (not shown) for locking or unlocking a door is driven by motor 12 and can be fixed to rotor assembly 14 above cooling fan 28. Alternatively, an automotive fan or HVAC fan can be coupled to motor 12. Motor 12 is preferably a direct current (DC) brushless motor, and has a height or profile less than 30 mm due to the advantageous design of motor 12. Motor 12 may be referred to as a slim-line motor which has a diameter-to-width ration greater than three to one. The window drive lock mechanism, or fan can be coupled directly to an outside surface 92 (FIGS. 1, 2 and 6) of rotor assembly 14 via a clip, a screw, or other fastening device (not shown). Alternatively, the drive mechanism, or fan can be form fitted to outside surface 92 of rotor assembly 14 over cooling fan 28 (FIG. 2) of motor 12 or attached to motor 12 via belts, gears, or other mechanisms. Motor 12 must be sized to fit within relatively small areas such as door compartments, hood compartments or trunk compartments.

It is understood that, while the detailed drawings, specific examples, and particular components values given describe preferred exemplary embodiment of the present invention, therefore the purpose of illustration only. The apparatus and method of the invention is not limited to the precise details and conditions disclosed. For example, although the motor includes control circuitry mounted within it, other electrical connections could be utilized. Further, although particular shapes and aperture dimensions have been shown, various other shapes, geometries and dimensions could be utilized for the various components of the motor. Thus, the changes may be made to the details disclosed without parting from the spirit of the invention which is defined by the following claims.

What is claimed is:

1. A brushless motor for automotive applications, the brushless motor comprising:
    a rotor including a rotor hub and at least one flat magnet mounted to the rotor hub;
    a stator adjacent the rotor and having a single flux plate proximate at least one stamped flat coil;
    a shaft;
    a bearing assembly including a bearing coupling defining a longitudinal bore and a bearing mounted within the bore of the bearing coupling, wherein the shaft is coupled to the rotor and the bearing assembly; and
    a ring coupler mounted about the bearing coupling of the bearing assembly, the ring coupler having a peripheral bearing surface that cooperates with a peripheral bearing surface of the bearing coupling to secure the flux plate between the peripheral bearing surfaces and support the single flux plate substantially parallel to the at least one stamped flat coil.

2. The brushless motor of claim 1 wherein the stator includes a plurality of flat coils.

3. The brushless motor of claim 1, further comprising:
    a multi-chip control module mechanically coupled to the flux plate.

4. The brushless motor of claim 1 wherein the bearing is a double horizontal row ball bearing assembly.

5. The brushless motor of claim 1 wherein the rotor hub is comprised of a rotor bell and the at least one flat magnet is located on an inside hub of the rotor bell.

6. The brushless motor of claim 1 further comprising a cooling fan fixed to the rotor.

7. The brushless motor of claim 6 wherein the rotor includes a plurality of vent apertures and the fan is disposed to cover the vent apertures.

8. The brushless motor of claim 1 wherein the bearing of the bearing assembly is selected from a group consisting of one of the following:
    an angular contact bearing, a four point contact bearing, and a crossed cylindrical bearing.

9. The brushless motor of claim 1 including a cooling fan coupled to the rotor, the fan providing air through an aperture extending through the rotor and wherein an automotive component is fit over the cooling fan and the motor.

10. The brushless motor of claim 1 wherein the single flux plate comprises a flux ring.

11. The brushless motor of claim 10 wherein the ring coupler and the bearing coupling of the bearing assembly each comprise aluminum.

12. The brushless motor of claim 11 further including means for securing the ring coupler to the bearing coupling of the bearing assembly.

13. A slim-line brushless motor, comprising:

a rotor including a rotor housing and a flat magnet;

a shaft member connected to the rotor housing, the shaft member defining a longitudinal axis;

a bearing coupling defining a longitudinal bore;

a contact bearing at least partially disposed in the bearing coupling that receives a portion of the shaft member to support the shaft member for rotational movement;

a stator including a flux ring and at least one flat coil, the flux ring and the at least one flat coil being coaxially arranged about the bearing coupling; and a locking ring coupling mounted about a portion of the bearing coupling to secure the flux ring between an engaging surface of the bearing coupling and a first engaging surface of the locking ring coupling and the at least one flat coil mounted to the locking ring coupling so that the at least one flat coil operatively contacts a second engaging surface of the locking ring coupling, said second engaging surface being substantially parallel to the first engaging surface of the locking ring coupling.

14. The brushless motor of claim 13, further comprising:

an end cap for at least partially enclosing the stator, the end cap being mounted to the bearing coupling.

15. The brushless motor of claim 13 wherein the bearing coupling includes a double horizontal row of ball bearings.

16. The brushless motor of claim 13 wherein said at least one flat coil comprises at least one stamped copper member.

17. The brushless motor of claim 13 further comprising a cooling fan fixed to the rotor.

18. The brushless motor of claim 17 wherein the rotor includes a plurality of vent apertures and the fan is disposed to cover the vent apertures.

19. The slim-line brushless motor of claim 13, wherein said at least one flat coil comprises at least two flat coils separated by a spacer disposed on said locking ring coupling.

20. The slim-line brushless motor of claim 13, wherein said locking ring coupling supports the at least one flat coil in a stacked relation with the flux ring.

* * * * *